July 2, 1968            E. P. CARTER           3,391,314
PROCESS AND APPARATUS FOR TREATING A PLASTIC
FILM BY ELECTRICAL DISCHARGE
Filed Nov. 18, 1964                                  2 Sheets-Sheet 2
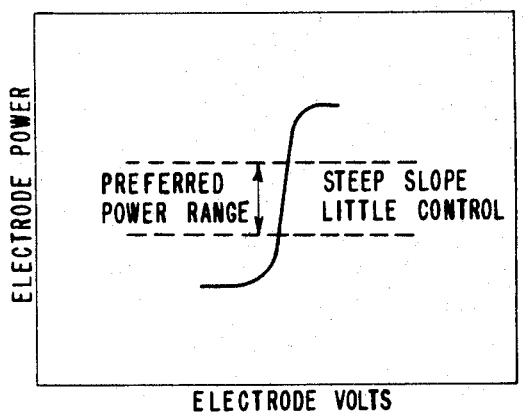
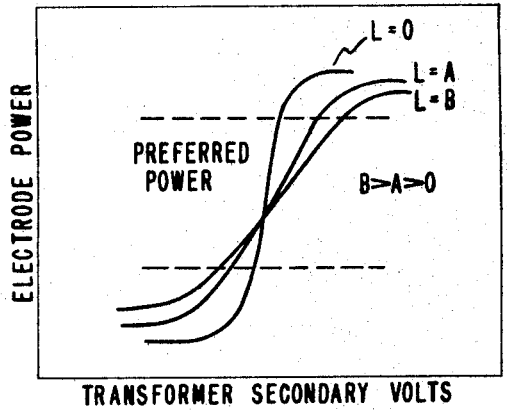
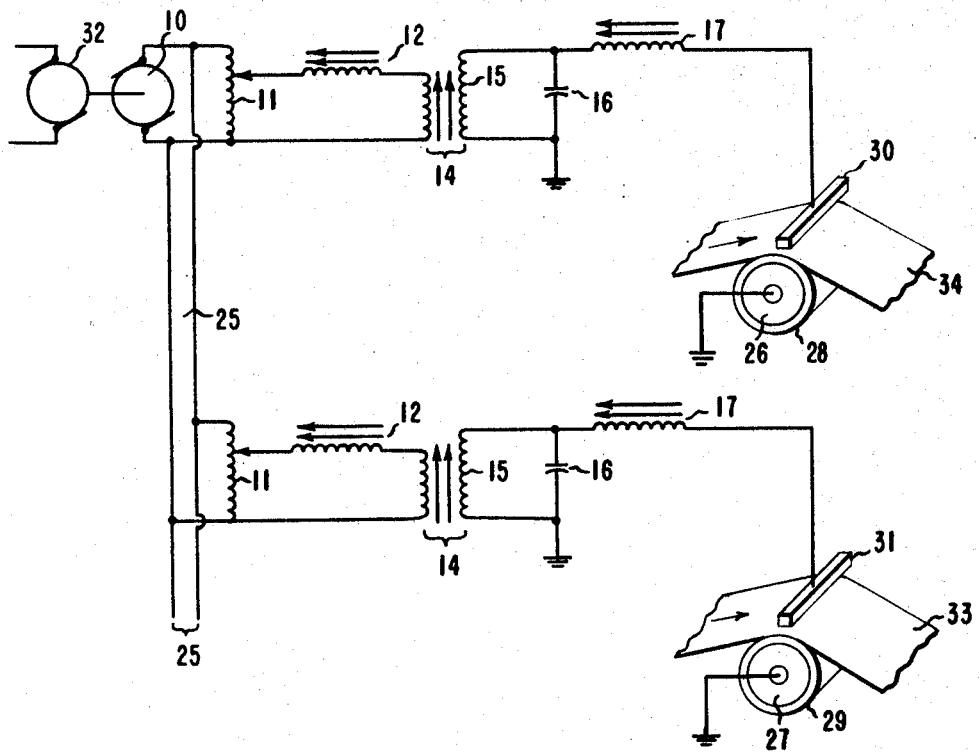
INVENTOR
ELBERT P. CARTER
BY *P. Palack Snyder*
ATTORNEY

United States Patent Office 3,391,314
Patented July 2, 1968

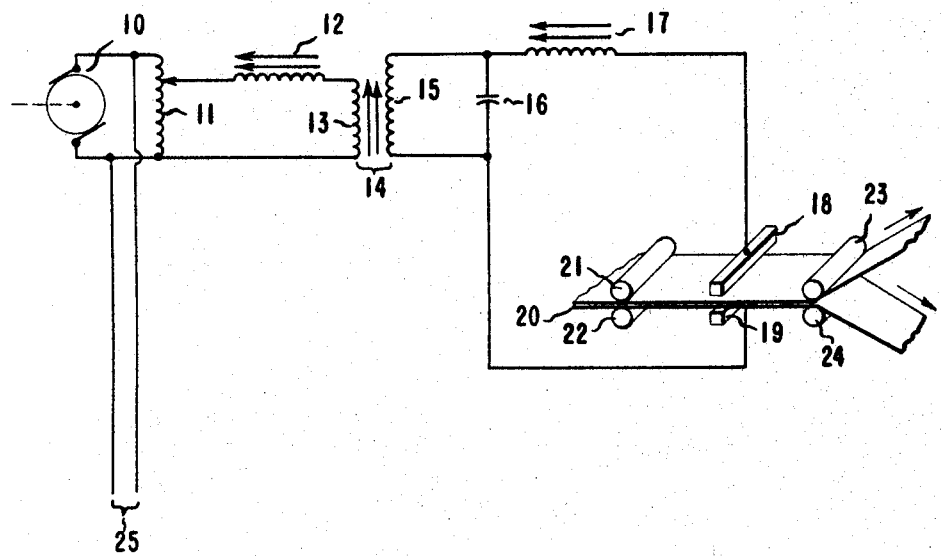
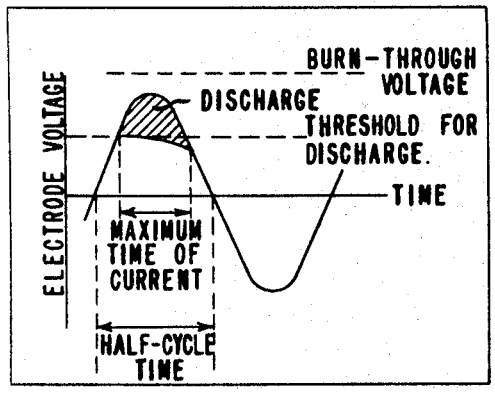
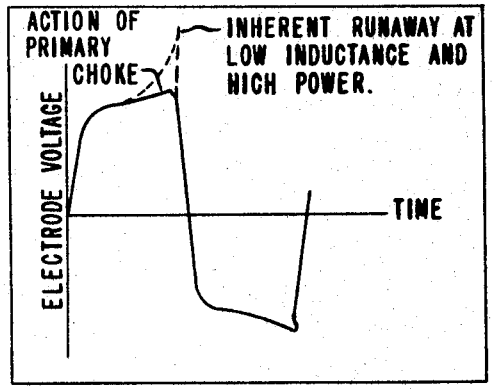

3,391,314
PROCESS AND APPARATUS FOR TREATING A PLASTIC FILM BY ELECTRICAL DISCHARGE
Elbert P. Carter, Wilmington, Del., assignor to E. I. du Pont de Nemours and Company, Wilmington, Del., a corporation of Delaware
Filed Nov. 18, 1964, Ser. No. 412,123
7 Claims. (Cl. 317—262)

ABSTRACT OF THE DISCLOSURE

A power supply circuit for regulating the voltage wave form of power supplied to the electrodes of apparatus for the electrical discharge treatment of dielectric plastic film, e.g., polyethylene film, said circuit comprising, interposed between (a) a motor driven alternator which supplies a sine wave output of audio frequency (e.g. about 3000 c.p.s.) and (b) the spaced treating electrodes between which film to be treated passes; (1) an adjustable autotransformer having its primary connected in parallel with the output of the alternator; (2) a variable coupling step-up transformer having its primary connected in parallel with the secondary of the autotransformer, and its secondary connected to the spaced treating electrodes; (3) a choke of preselected value connected in series between the auto and step-up transformers; (4) a capacitor across the secondary of the step-up transformer forming with the secondary a "tank" circuit tuned to resonate at the fundamental frequency, and having a Q of at least 5; and (5) a choke connected in series with the secondary of the step-up transformer and one of the spaced treating electrodes, said choke and the effective capacitance of the gap between the spaced electrodes having a natural frequency approximately three times that of the power supply. This circuit operates to convert the voltage wave form from a sine wave at the alternator to a trapezoidal form at each half cycle across the treating electrodes, in contrast to the distorted sine wave conventionally generated at the treating electrodes.

Among the problems encountered in conventional processes for improving the surface characteristics of a moving plastic or dielectric film, e.g., of polyethylene, polypropylene, or the like, by means of an electrical discharge across a gap is that of regulating the voltage and power supplied to the discharge. The problem is always present when more than one gap, either on a single treating station such as the "double bar" treating apparatus or treater or on separate treating stations, is driven from a single generator. The difficulty increases as the rate of travel of the film and the power are increased even when a generator drives but a single gap. In the case of the double-bar treater (see British Patent 964,132) or other apparatus which can treat both sides of a rapidly moving laminated film, the problem is difficult at relatively low power levels, particularly with the thinnest films.

An object of the invention is, therefore, provision of an improved apparatus and process for treating a moving dielectric film by means of an electrical discharge.

Another object is provision of an improved control means and process for supplying power to an electrical discharge apparatus for treating a moving dielectric film, particularly where more than one electrical discharge is supplied with power from a single generator.

A further object is provision of an improved means and process for treating both sides of laminated film as by a use of a double-bar apparatus.

The above-mentioned and yet other objects are achieved in accordance with this invention by inserting between a conventional sine-wave generator and the treating electrode to be employed an adjustable inductive step-up transformer. Grouped around this transformer are three basic cooperating elements: (1) in series with the primary of the transformer and the generator, an inductive reactor which limits the current to the transformer when peak power is drawn at the gap: (2) across the secondary of the transformer, a capacitor forming with the secondary a tank circuit tuned to resonate at the frequency of the generator and having a Q of at least 5, i.e., capable of storing at least 5 times as much power as is drawn by the gap at discharge; and (3), in series with the secondary and the discharge gap, an inductance which, in combination with the other circuit elements, resonates at a frequency approximately, e.g., ±20%, three times that of the sine-wave generator. The voltage wave form generated by this apparatus at the gap across, and in conjunction with, the dielectric film may be termed roughly trapezoidal in contrast with the distorted sine wave generated conventionally.

The invention will be understood in more detail from the description which follows and from the drawings in which:

FIG. 1 is a schematic diagram showing a double-bar treating apparatus employing the circuit of the invention;

FIG. 2 is a voltage waveform of the conventional sine-wave type it is desired to improve;

FIG. 3 is a voltage waveform of the trapezoidal type provided by the apparatus of FIG. 1;

FIG. 4 is a power v. voltage curve for the conventional circuit employing a sine wave;

FIG. 5 shows power v. voltage curves for increasing values of inductance in the secondary circuit of the present invention; and FIG. 6 shows a plurality of grounded roll electrodes driven from the same power source.

Described in more detail, FIG. 1 discloses an alternator 10 driven by a motor (not shown) which supplies a sine-wave output of audio frequency (generally about 3000 c.p.s. in practice) through adjustable autotransformer 11 to the primary 13 of a variable coupling step-up transformer 14 (and to line 25, if desired). In the circuit with the autotransformer 11 and primary 13 is a choke 12 of a preselected value as noted below. The secondary 15 of transformer 14 ultimately drives the two bars 18 and 19 of a double-bar film treater through which a laminated plastic film 20, e.g., of polyethylene, is driven through rollers 21, 22, 23 and 24 to be treated. Across secondary 15 is a capacitor 16 and in the line between one side of the secondary and a treater bar, e.g., 18, is choke 17. Capacitor 16 and the inductance of the secondary 15 form the tank circuit tuned to resonate at the fundamental frequency.

In operation, the tank circuit stores power so that the wave-shaping effect of the final output will not distort the waveform at the transformer secondary 15. This storage capacity should be at the fundamental of the power supply frequency. The choke in the secondary in series with the gap and its associated capacitance is related to resonate at approximately three times the input power frequency, e.g., 9 kc. The combination of the 9 kc. voltage wave across the secondary choke at the transformer secondary produces a trapezoidal voltage wave across the gap during each half cycle characterized by a rapid increase in voltage to the gas breakdown or discharge initiation value, followed by a gradual (ramp) increase as the gas discharge proceeds.

At lower power levels the maximum voltage reached by the ramp is controlled by the return to zero by the input power wave upon completion of a half cycle; at higher power levels the negative resistance characteristic tends to let the current "run away" before the end of the half cycle, and causes excessive currents in the gap. At this point the primary series inductive reactor comes into action: it limits the current to the tank circuit at the voltage peaks in each half cycle, and prevents the voltage from "taking off," as shown by the broken peak in FIG. 3. The combination of elements in this invention to provide a trapezoidal wave results in current flow in the gap for substantially all of the half cycle, as compared to only a small fraction of the half-cycle time in which current would flow in a sine wave as shown by the shaded portion of FIG. 2. Power dissipated in the gap determines the efficacy of treatment, thus the desirability of the trapezoid. The maximum power which can be controlled limits the processing speed or throughput also.

It may be noted that the wave-shape of FIG. 3 is produced by several factors. The leading edge, sharper than that of a conventional sine wave, is produced by the distorted third harmonic inserted by the circuit containing choke 17. The ramp then beginning when the breakdown voltage of the gas is reached is really the charging curve of the dielectric film 20. The steep trailing edge results from the simultaneous polarity reversal of the fundamental and third-harmonic waves.

The combination of the elements of the present invention decreases the sensitivity of the power dissipated in the gap to fluctuations in voltage, and enables the precise control of power in the desired range by input voltage adjustments. FIG. 4 illustrates the sensitivity of electrode or dissipated power to voltage variations where sine wave power is supplied to the electrodes; the steep slope of the curve makes it virtually impossible to maintain the power within an acceptable range. As is well known to those skilled in the art, low power levels do not afford sufficient adhesion of printing inks, while higher power levels may impair the strength of heat seals, therefore an acceptable range of dissipated power exists, and it is essential to maintain the discharge within this range.

The effect of the secondary inductance in facilitating the control of power is illustrated in FIG. 5. Measurement of the power at the electrodes dissipated during discharge for various levels of inductance (choke 17 of FIG. 1) shows that higher values of inductance of this element provide power dissipation over a wide range of voltage in the secondary of the step-up transformer. Obviously from this curve it is seen that if inductance values are too high, the slope of the curves might be too small and adjustment of power could not be achieved by voltage adjustments.

When a plurality of autotransformers is fed from a single sine-wave generator, it is also found that variations in voltage and current in one circuit do not appreciably affect the others. FIG. 6 illustrates the use of the apparatus of the present invention in driving more than one treating unit. In FIG. 6 are other elements of the basic apparatus indicated by the same numerals as shown in FIG. 1, with the substitution of grounded roll treaters 26 and 27 having buffer dielectric coatings 28 and 29 thereon for the double bar treater. Films 33 and 34 pass over these rolls in contact with the buffer dielectric, and in spaced relation to electrodes 30 and 31 to provide an air gap (20 to 50 mils). It may be noted, incidentally, that by virtue of the adjustability and control possible with the apparatus of the present invention this apparatus is especially adapted to operation with rolls without the buffer dielectric. Each treater unit is coupled to audio frequency line 25, which is supplied by alternator 10, driven by motor 32 supplied by power from a conventional power line. Grounded roll treaters may be separate treaters treating one side of a single sheet, or may be positioned to sequentially treat the outer surfaces of two sheets in laminar relation.

The assembly and adjustment of the apparatus of the present invention may be carried out empirically and relatively simply. Given a 3 kc. motor driven alternator, means to control the input voltage, and an adjustable autotransformer, the stepwise procedure for setting up the remaining elements in their novel relationship is:

(1) Select a step-up transformer to provide the voltage and the power in the required range. This transformer will have an adjustable gap in the core and a capacitor in parallel with the secondary to provide a tank circuit which at the fundamental, or input, frequency has a Q greater than 5, or a power storage capability of at least 5 times the power dissipated;

(2) Select an adjustable primary inductance which at its mid-point of adjustment has a voltage drop at the primary supply frequency equal to two-thirds the input voltage at maximum power;

(3) Adjust the secondary inductor to resonate in series with the gap (interelectrode) capacitance at approximately three times the input frequency;

(4) By selection and adjustment of various values of the secondary voltage, plot output power (measured with a watt meter) as a function of transformer secondary voltage as shown in a typical curve in attached FIG. 5;

(5) From the curve showing the widest voltage in the range of power desired select the value of secondary inductance to be employed; and (6) If after these adjustments the power tends to "run away" at high power levels increase the primary inductance until satisfactory power control is realized. As the input voltage is increased by turning up the autotransformer, with low primary inductance the autotransformer setting becomes critical and power control is difficult.

The determination of the values of the various elements above may be made on the basis of well known engineering calculations.

There follow some examples showing the use of treaters constructed according to the present invention.

*Example 1*

A series of runs was made on polyethylene film using a double-bar electrode at 3 kc. as illustrated in FIG. 1 to improve the printability of the film. The speed of the film through the treaters was 120 ft./min.

(A) It proved impossible to treat 1.25 mil polyethylene with no inductance (17) in the output circuit. Voltage and power dissipation for 208 (column 1) and 390 (column 2) millihenries inductance are as follows:

| Dissipated Power (Watts) | Applied Voltage (kv., rms.) | |
|---|---|---|
| | 1 | 2 |
| 300 | 4.45 | 3.90 |
| 400 | 4.70 | 4.00 |
| 500 | 4.90 | 4.15 |
| 600 | 5.15 | 4.30 |
| 700 | 5.35 | 4.45 |

(B) Results on a 1.5 mil polyethylene film are as follows for 0 (column 1), 208 (column 2) and 340 (column 3) millihenries inductance:

| Power (Watts) | Applied Voltage (kv., rms.) | | |
|---|---|---|---|
| | 1 | 2 | 3 |
| 300 | 5.20 | 4.65 | 4.00 |
| 400 | 5.30 | 4.85 | 4.10 |
| 500 | 5.50 | 5.10 | 4.25 |
| 600 | 5.70 | 5.35 | 4.40 |
| 700 | 5.90 | 5.60 | 4.55 |

(C) Similar results for a 2.0 mil polyethylene film with 0, 208 and 340 millihenries inductance are:

| Power (Watts) | Applied Voltage (kv., rms.) | | |
|---|---|---|---|
| | 1 | 2 | 3 |
| 300 | 5.25 | 4.50 | 4.20 |
| 400 | 5.50 | 5.15 | 4.40 |
| 500 | 5.75 | 5.45 | 4.40 |
| 600 | 6.05 | 5.65 | 4.45 |
| 700 | 6.30 | 5.85 | 4.90 |

*Example 2*

Another series of four runs was made to determine the utility of the present invention in treating polyethylene in a roll-type treating apparatus (FIG. 6; see U.S. Patent 2,859,481) 70 inches wide and with a 0.30″ interelectrode gap using a 3 kc. power supply. A buffer dielectric 26 of FIG. 6 composed of various thicknesses of "Mylar" (Du Pont trademark for polyester film) was used in treatment of 1.25 mil polyethylene film at a speed of 140 ft./min. Results were as follows:

| Buffer Dielectric, mils | Input, watts | Electrode | | Print Rating | Heat Seal, g./sq. in. |
| --- | --- | --- | --- | --- | --- |
| | | Kv. | Ma. | | |
| 4 | 415 | 4.4 | 210 | 10 | 1,200 |
| 6 | 300 | 4.35 | 150 | 10 | 1,540 |
| 2 | 445 | 4.0 | 215 | 10 | 1,313 |
| 0 | 450 | 3.2 | 235 | 10 | 1,580 |

The present invention enables operation of two or more treating units from a single sine wave generator as in FIG. 6 by virtue of high energy storage in the tank circuit which prevents the power dissipation in discharge from affecting the wave form of the power supply, and by the use of separate autotransformers in each treating unit to control the voltage and power of each unit.

While the examples above illustrate the treatment of polyethylene, other plastic films such as those of polypropylene, blends of high- and low-density polyethylene, copolymers of polyethylene and polypropylene, polyethylene terephthalate, polyvinylchloride, polyvinylfluoride, and the like can be treated as well.

It will be understood that other means for generating the trapezoidal wave of this invention across the travelling dielectric, e.g., as disclosed in U.S. Patent 3,100,851, can be used as well as that shown.

Since obvious modifications and equivalents in the invention will be evident to those skilled in the art, I propose to be bound solely by the appended claims.

The embodiments of the invention in which an exclusive property or privilege is claimed are defined as follows:

1. In a process for improving the surface characteristics of a plastic film positioned between electrodes by means of an electrical discharge, the step of developing said voltage across said electrodes as a trapezoidal wave.

2. In the process of electrical discharge-treatment of a plastic film to improve the surface characteristics thereof by passage of said film through a gaseous electrical discharge between electrodes, the improvement comprising developing a voltage wave across said electrodes having cycles alternating in polarity with time and having a trapezoidal half cycle with a substantially vertical rise to a positive polarity voltage corresponding to the breakdown voltage of said gap, followed for substantially the remainder of the time of the half cycle by a substantially linear increase in voltage to a maximum voltage below the minimum voltage to produce a current sufficient to burn through said film, said voltage then falling substantially vertically to zero from which value said half wave is repeated with a negative polarity voltage.

3. Apparatus for electrical discharge treatment of a moving plastic film comprising:
   (a) a source of alternating current power of audio frequency;
   (b) electrodes spaced to provide a gas gap between the same admitting the plastic film;
   (c) a step-up transformer having a primary and a secondary with an output in excess of the minimum for initiation and maintenance of self-sustaining electrical discharge in said gap, said transformer having an adjustable, gapped core and a capacitor in parallel across the secondary of the transformer forming a tank circuit therewith having a Q of at least 5;
   (d) a choke in series with the tank circuit and the gap, said choke and the effective capacitance of the gap forming a resonant circuit having a natural frequency approximately three times that of the power supply;
   (e) an inductive series reactor in series with said primary to limit power to said tank circuit at each half cycle; and
   (f) an adjustable autotransformer coupling the primary circuit of said step-up transformer;

said apparatus developing an output voltage across the electrodes having a step-ramp trapezoidal form.

4. In the circuit supplying power at audio frequencies from a power source to an electrode for the electrical discharge treatment of moving plastic film, the improvement which comprises means for preventing changes in electrical conditions at the electrode from affecting said power source comprising a step-up transformer the primary of which is connected to the power source and the secondary of which is connected to the electrode through an inductor connected in series between the secondary and the electrode and tuned to oscillate with the other circuit parameters at a frequency approximately three times that of the power source, and means in the circuit of the secondary forming a tank circuit therewith having a Q of at least 5.

5. The circuit of claim 4 wherein the means forming a tank circuit with the secondary is a capacitor across the same.

6. In the circuit supplying power at audio frequencies from a power source producing a sine-wave voltage to an electrode for the electrical discharge treatment of a moving plastic film, the improvement which comprises wave-shaping means between said power source and said electrode supplying to said sine-wave voltage a component which is approximately the third harmonic thereof.

7. The circuit of claim 6 wherein said wave-shaping means includes an inductor connected to the electrode in the circuit between the electrode and the power source tuned to oscillate, with the other circuit parameters, at a frequency approximately three times that of the power source.

References Cited

UNITED STATES PATENTS

| | | | |
| --- | --- | --- | --- |
| 2,167,976 | 8/1939 | Hanson | 204—327 |
| 2,802,085 | 8/1957 | Rothacker | 204—168 X |
| 2,810,933 | 10/1957 | Pierce et al. | 317—262 X |
| 2,859,481 | 11/1958 | Kaghan et al. | 317—262 X |
| 2,864,755 | 12/1958 | Rothacker | 204—168 |
| 2,881,470 | 4/1959 | Berthold et al. | 18—1 |
| 2,882,412 | 4/1959 | Cunningham | 317—262 X |
| 2,935,418 | 5/1960 | Berthold et al. | 117—47 |
| 3,100,851 | 8/1963 | Ross et al. | 307—107 |
| 3,192,385 | 6/1965 | Antokal | 204—165 X |

OTHER REFERENCES

Wilson et al.: "Guide to Corona Film Treatment," Modern Plastics, pp. 199–206, 344, May 1961.

LEE T. HIX, *Primary Examiner.*